(12) United States Patent
Kevan et al.

(10) Patent No.: US 7,162,362 B2
(45) Date of Patent: Jan. 9, 2007

(54) METHOD AND SYSTEM FOR PROVISIONING ELECTRONIC FIELD GUIDES

(75) Inventors: Sherrene D. Kevan, Cambridge (CA); Peter G. Kevan, Cambridge (CA); Dave Pletsch, Guelph (CA)

(73) Assignees: Sherrene Kevan, Cambridge (CA); Peter Kevan, Cambridge (CA)

( * ) Notice: Subject to any disclaimer, the term of this patent is extended or adjusted under 35 U.S.C. 154(b) by 460 days.

(21) Appl. No.: 10/092,162

(22) Filed: Mar. 6, 2002

(65) Prior Publication Data

US 2002/0152225 A1    Oct. 17, 2002

Related U.S. Application Data

(60) Provisional application No. 60/273,542, filed on Mar. 7, 2001.

(51) Int. Cl.
 *G01C 21/26* (2006.01)
(52) U.S. Cl. .............. 701/201; 701/209; 707/104.1; 455/556
(58) Field of Classification Search .......... 707/104.1, 707/3, 103, 102, 500, 517, 523, 522, 526; 455/556, 566; 701/201, 209, 211
See application file for complete search history.

(56) References Cited

U.S. PATENT DOCUMENTS

| | | | |
|---|---|---|---|
| 3,638,709 A * | 2/1972 | Brown et al. ............ | 156/57 |
| 5,757,417 A | 5/1998 | Aras et al. | |
| 5,802,492 A | 9/1998 | DeLorme et al. | |
| 5,907,837 A | 5/1999 | Ferrel et al. | |
| 5,978,855 A | 11/1999 | Metz et al. | |
| 6,230,173 B1 | 5/2001 | Ferrel et al. | |
| 6,321,158 B1 * | 11/2001 | DeLorme et al. ........... | 701/201 |
| 6,345,279 B1 | 2/2002 | Li et al. | |
| 6,385,306 B1 | 5/2002 | Baxter, Jr. | |
| 6,487,012 B1 * | 11/2002 | Khoshnevis et al. ........ | 359/407 |
| 2002/0151327 A1 * | 10/2002 | Levitt ........................ | 455/556 |

OTHER PUBLICATIONS

Birdsong Indentiflyer; http://www.identiflyer.com/index.html.
BirdBrain; http://et.sdsu.edu/SDamasceno/BBusplan/ThePlan.htm.
AviSys 4.57—Superior Birding Software; http://www.avisys.net.
ABA Sales Online Birding Store; http://208.56.18.90/cgi-bin/miva?Merchant2/merchant.mv+.
Wildlife Computing Pocket Bird Recorder; http://www.wildlife.co.uk/pocket.htm.
Wildlife Computing Pocket Bird Recorder for Palm-Sized PCs; http://www.wildlife.co.uk/palm.htm.

* cited by examiner

*Primary Examiner*—Charles Rones
*Assistant Examiner*—Belix M. Ortiz
(74) *Attorney, Agent, or Firm*—Dinsmore & Shohl LLP

(57) ABSTRACT

The electronic field guide of the invention presents multiple data items to an end user, via the display of a stationary computer, and allows the user to select particular ones of the multiple data items that are available. Multimedia data files corresponding to the selected items are then downloaded onto a portable computing device such as a personal digital assistant (PDA). Thus, the user will have access to a subset of the overall data on his portable PDA. This invention may be used, for example, to provide electronic field guides in such applications as bird watching, where the multimedia data files contain the images of birds, audio files containing their songs, and text data. The main data may be stored on a CDrom, be made available over the Internet, or be provided in some other manner.

9 Claims, 12 Drawing Sheets

METHOD AND SYSTEM FOR PROVISIONING ELECTRONIC FIELD GUIDES

CROSS-REFERENCE TO RELATED APPLICATIONS

This application claims the benefit of U.S. Provisional Application Ser. No. 60/273,542, METHOD AND SYSTEM FOR PROVISIONING ELECTRONIC FIELD GUIDES, filed Mar. 7, 2001.

BACKGROUND OF THE INVENTION

The present invention relates generally to computers and computer software, and more specifically, to a method and system for provisioning electronic field guides.

Over the last two decades there has been a dramatic increase in the public's awareness of their natural environment. This has resulted in public pressure to reduce pollution and waste, and has also resulted in an increase in outdoor recreation. Eco-tourism, hiking and birdwatching, for example, are now widespread. In fact, studies have shown that 54 million Americans consider bird watching to be a favoured activity, and that from 1983 to 1996, the number of bird watchers has increased by 155%.

Printed field guides have long been the standard tool for amateur bird watchers, ornithologists and academic researchers alike. A field guide for birdwatching, for example, generally includes photographs of each bird that may be found in a large geographical area (such as North America) with a short textual description on each.

Birds are highly mobile, which makes indexing difficult. Although varieties of birds maybe generally categorized by their environment (swamp, grassland, etc.) or their geographic area, a given bird may visit entirely different areas from time to time, particularly as part of their annual migration routes. As well, two varieties of birds may have overlapping but otherwise completely different coverage profiles. Thus, an indexing system must account for particular birds appearing in multiple and different areas. Such an extensive cross-indexing system is not easily implemented in a printed form, so bird watchers are usually forced to flip through their entire guide or guides to identify a certain bird they have found.

In addition to this lack of an effective index, of course, printed publications are static and cannot be readily updated, and cannot offer audio media (such as playing a bird's songs or calls).

With the recent proliferation of personal computers, pervasive communication networks like the Internet, and high-density, low-cost storage capacity in the form of optical compact disks (CD-roms), it is no surprise that many of these printed field guides have evolved to an electronic form. However, these products have not improved much from the printed form—they still offer the simple presentation of photographs and basic text, using a weak indexing system. As well, of course, personal computers are not mobile, so these new tools cannot be used in the field.

Several other electronic bird-watching products have appeared on the market recently though. The identiflyer™, for example, is a dedicated and portable electronic device into which pre-programmed cards are inserted (see www.identiflyer.com). Although this device plays the song of an identified bird, it has many limitations, including the following:

1. each pre-programmed card can only support ten images and songs. If additional birds are desired, then additional cards must be purchased. In order to have a reasonable database of 160 birds for example, the end user would have to fumble through 16 sound cards to find the card he/she desires and check the song against that of the bird he/she is hearing. Clearly, this would be a clumsy and time consuming exercise to perform while out in the field;
2. there is no indexing system;
3. the printed images of the birds are very small;
4. there is no room on the cards to present any data on the birds themselves; and
5. it has no capacity to record sightings or other data.

A number of other devices have also appeared on the market, which take advantage of personal digital assistants (PDAs) such as the PalmPilot™, PocketPC™, Handspring™ Visor™, Palmcorder™, or Compaq™ Aero™, and similar hand-held electronic or wireless telephone products. PDAs are hand-held devices which offer functionality similar to personal computers, but with much more restricted resources, for example, their display screens are smaller and have less resolution, they have limited memory capacity, and their input interfaces are generally limited. However, because of their flexibility and portability, they hold promise for implementing electronic field guides.

In fact, several attempts have been made to offer PDA-based electronic field guides, including the following:

1. the Pocket Bird Recorder™ which provides a listing of birds and allows the end user to enter sighting data and later upload it to their personal computer. This device does not, however, play the bird's songs, or present any images;
2. the Avisys™ database, which, like the Pocket Bird Recorder, provides a listing of birds and allows the end user to enter sighting data and upload it to their personal computer later. Like the Pocket Bird Recorder, this device does not play bird's songs nor present any images; and
3. the Birdbrain™, which allows the end user to record the sounds of birds, and to make notes (see http://et.sdsu.edu/SDemesceno/BB_busplan/). Like the other Palm-based offers, this device does not present images or pre-recorded bird's songs.

Thus, none of these devices offer a powerful and effective tool for implementing an electronic field guide.

If the above problems could be overcome, electronic field guides could be provided for a large number of applications including plant life, animals, reptiles, insects, marine life, and rocks and minerals. Electronic field guides could also be tailored to particular eco-tours or particular geographic areas such as national parks, mountain ranges, tourist areas or particular islands.

There is therefore a need for a method and system of electronic field guides provided with consideration for the problems outlined above.

SUMMARY OF THE INVENTION

It is therefore an object of the invention to provide a method and system which obviates or mitigates at least one of the disadvantages described above.

One aspect of the invention is broadly defined as a system for provisioning electronic field guides comprising: a portable computing device having: a visual display; an end user input interface; and a memory; a stationary computer having: a visual display; an end user input interface; and a memory; means for interconnecting the stationary computer and the portable computing device; the stationary computer being operable to: present multiple data items to an end user; and respond to the selection of particular ones of the multiple data items by the end user, by: downloading multimedia data files corresponding to the particular ones of the multiple data items, to the portable computing device via the means for interconnecting; and the portable computing device being operable to: present a listing of the downloaded multiple data items; and respond to the selection of one of the downloaded multiple data items by playing the corresponding multimedia data file.

Another aspect of the invention is defined as a method for provisioning electronic field guides comprising the steps of: presenting multiple data items to an end user, via the display of a stationary computer; and responding to the selection of particular ones of the multiple data items by the end user, by: downloading multimedia data files corresponding to the particular ones of the multiple data items, to a portable computing device; whereby the portable computing device may present the multimedia content to the end user in the field.

A further aspect of the invention is defined as a portable electronic field guide comprising: display means for displaying a digital image; speaker means for audibly reproducing a digital audio data file; memory means for storing digital content to produce the digital image and the digital audio data; communication means for downloading the digital content from a stationary computer, the digital content being selected from a more comprehensive database on the stationary computer; and power supply means for powering the display means, speaker means, memory means and communication means.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

A system which addresses the objects outlined above, does so by employing two computing devices rather than just one: a portable or hand-held device, and a more powerful, generally stationary, computer system. This allows the resource intensive storage, indexing and other manipulations to be performed on the stationary computer system, while minimal demands are placed on the portable device: storing a selected subset of the main database and playing the associated multimedia contents.

Figure 1:
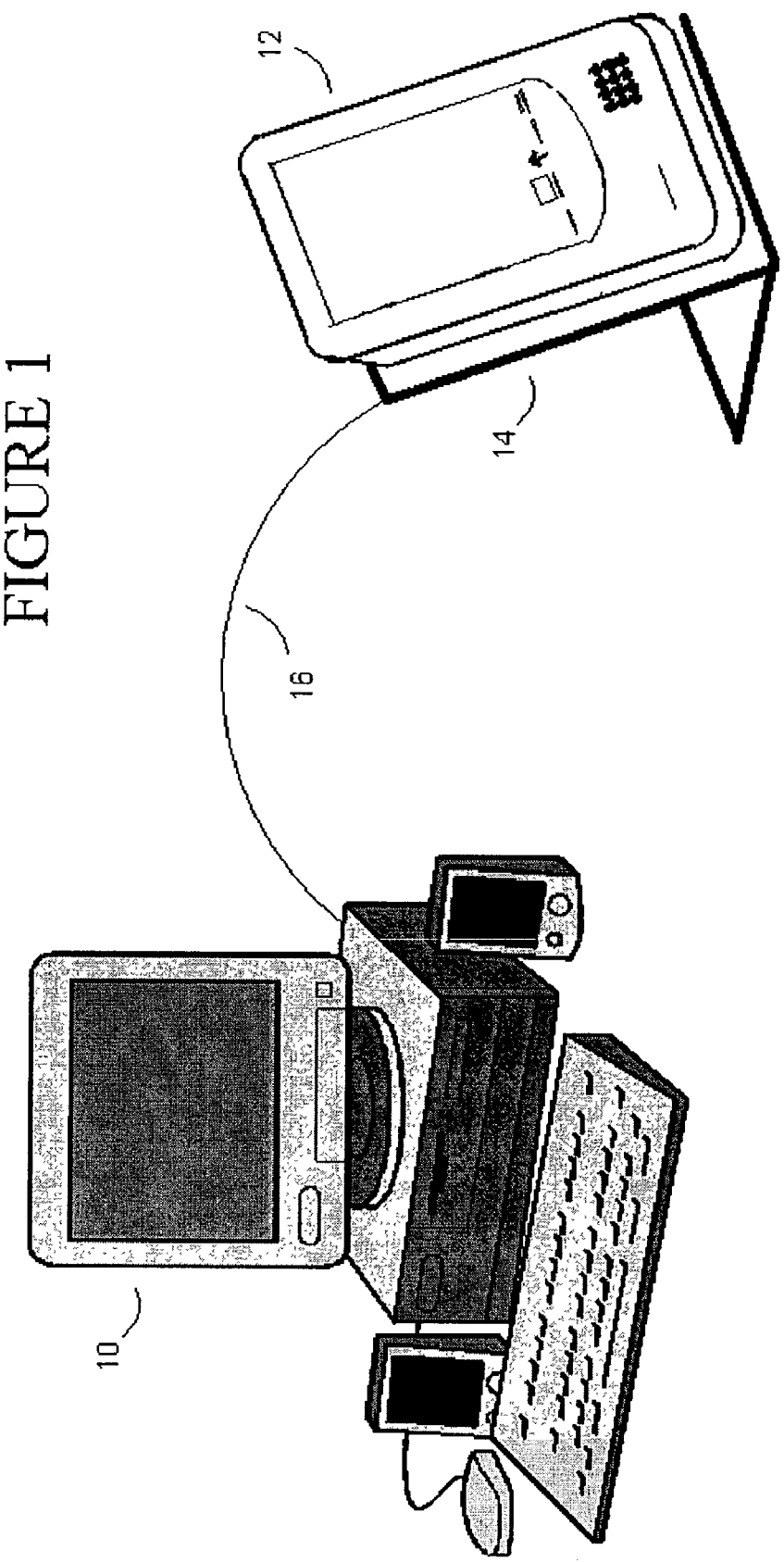
FIG. 1 presents a block diagram of a system of the invention.

To present a framework for discussion, the system of the invention may be implemented per FIG. 1. This diagram simply presents the stationary computer in the form of a personal computer (PC) 10, and the portable, hand-held device in the form of a personal digital assistant (PDA) 12. These two devices are typically interconnected by resting the PDA 12 in a cradle 14 which is electrically connected to the stationary computer 10 via a cable 16 and data interface of some sort (wireless infrared or IR communication links are also becoming more common). The Palm, for example, uses a USB (universal services bus) connection at the PC 10. Such arrangements are well known in the art.

Figure 2:
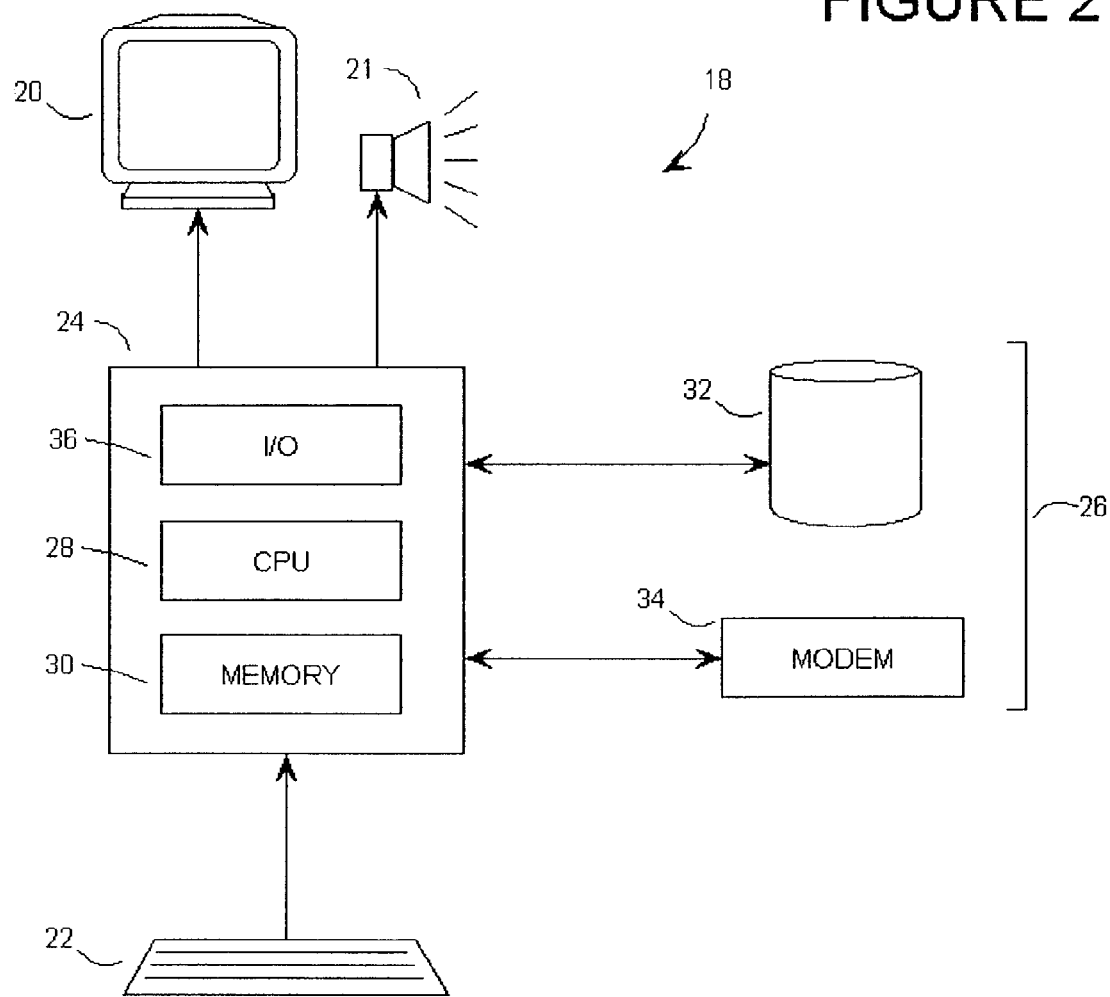
FIG. 2 presents a block diagram of an exemplary computing system for use with the invention.

An example of a stationary computer system upon which the invention may be implemented is presented as a block diagram in FIG. 2. This computer system 18 includes a display 20, audio driver 21, keyboard 22, computer 24 and external devices 26.

The computer 24 may contain one or more processors or microprocessors, such as a central processing unit (CPU) 28. The CPU 28 performs arithmetic calculations and control functions to execute software stored in an internal memory 30, preferably random access memory (RAM) and/or read only memory (ROM), and possibly additional memory 32. The additional memory 32 may include, for example, mass memory storage, hard disk drives, floppy disk drives, magnetic tape drives, compact disk drives, optical disks, CD-rom drives, DVD drives, program cartridges and cartridge interfaces such as that found in video game devices, removable memory chips such as EPROM, or PROM, or similar storage media as known in the art. This additional memory 32 may be physically internal to the computer 24, or external as shown in FIG. 2.

The computer system 18 may also include other means for allowing computer programs or data to be loaded. Such means can include, for example, a communications interface 34 which allows software and data to be transferred between the computer system 18 and external systems. Examples of communications interface 34 can include a modem, a network interface such as an Ethernet card, a USB (universal services bus) port, or a serial or parallel communications port. Software and data transferred via communications interface 34 are in the form of signals which can be electronic, electromagnetic, optical or other signals capable of being received by communications interface 34.

Input and output to and from the computer 24 is administered by the input/output (I/O) interface 36. This I/O interface 36 administers control of the display 20, keyboard 22, external devices 26 and other such components of the computer system 18.

The invention is described in these terms for convenience purposes only. It would be clear to one skilled in the art that the invention may be applied to other computer or control systems 18.

The portable or hand-held computing device 12 would have a similar structure and components, though typically, the resources of such portable devices are much more limited than stationary computers due to their smaller physical size and limited power availability. Portable devices presently available are battery powered and have CPU speeds that run at about 20% of the rate of stationary computers of the same vintage. Also, as noted above, portable and hand-held computing devices typically have smaller display screens with lower resolution, smaller storage capacity, and limited interface capabilities. As time passes though, it is expected that the resources of commonly available portable computing devices such as personal digital assistants (PDAs) will continue to improve. It is also expected that the necessary functionality required to implement the invention will also become more commonly available on other portable electronic appliances such as cellular telephones, televisions, television set top units, entertainment units and automobiles.

Figure 3:
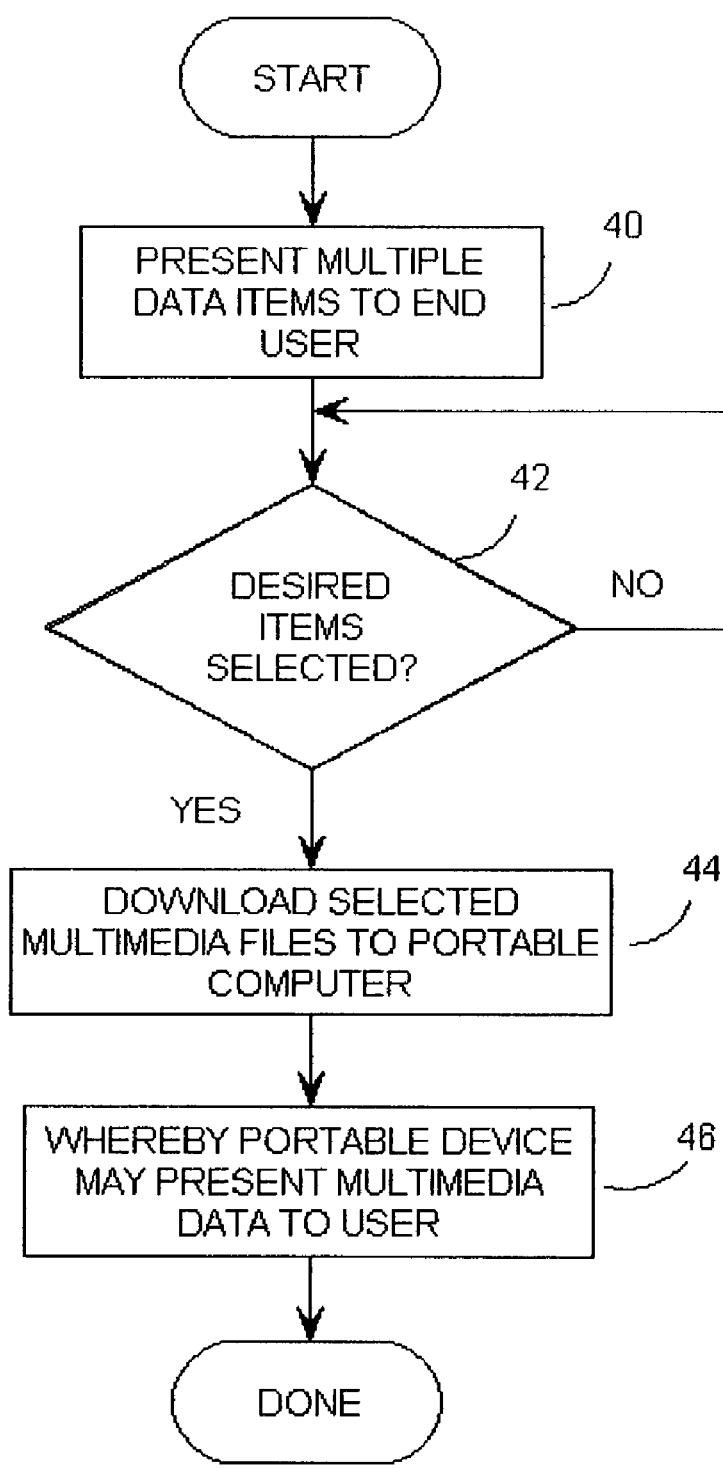
FIG. 3 presents a flow chart of an exemplary method of provisioning electronic field guides, in a broad embodiment of the invention.

An exemplary methodology for implementing the invention on such a system is presented as a flow chart in FIG. 3. This process begins at step 40 where the stationary computer 10 presents a listing of multiple data items to the end user. At step 42, the end user is then given the opportunity to inspect and select particular ones of the multiple data items. The multimedia content corresponding to the select items, are then downloaded to the portable computer 12 at step 44. As noted at step 46, this then allows the end user to play the multimedia content on their portable computer 12.

The implementation of this methodology would be quite straightforward to one skilled in the art as the fundamental tools for implementing it already exist. For example, it could be implemented using a personal computer as the stationary component 10, and a Palm as the portable device 12.

Steps 40 and 42 simply require software code that presents a listing of the files that are available, and allows the end user to compile a listing of files that they desire. Current Windows™ and Linux™ based operating systems both have routines to present suitable browse lists to the end user, and routines that allow the end user to select desired items. Of course, even in the absence of such an environment, the software code necessary to provide such functionality is quite straightforward and would be within the capability of one skilled in the art.

As noted above, one of the main advantages of the invention is that any complex presentation, indexing and cross-indexing of the available files is done on the PC 10, which has far greater resources than the portable device 12. Such techniques are known in the art, and a number of them are described in detail hereinafter.

In a typical PC/Palm environment, software and data to be transferred from the PC 10 to the Palm 12 are simply stored in the Palm folder of the PC 10 and the contents of the Palm folder may be automatically downloaded to the Palm 12 the next time it is installed on its cradle 14. A more detailed description of this process is included hereinafter. Similarly functionality is also commonplace for other computer platforms.

The nature of the multimedia content itself, will vary with the application. Bird watching data, for example, may consist of colour or grey-scale images, text, audio files of songs or calls, and perhaps even video files. The complexity of the content is limited only by the processing power and memory available on the portable device 12. In contrast, rock and mineral guides, for example, may only require images and text, though it may be of use to include audio files which highlight particular points about a given rock or mineral. It may also be of use to transfer software code such as executable Java™ applets to the portable computer 12 as part of the multimedia content.

Although the interconnection between the stationary computer 10 and the portable computer 12 is generally described as a hard-wired, local connection, it could be virtually any communication connection or network, or even several different networks working together, including: wireless networks such as wireless local loops or cellular telephone networks, the public switched telephone network, cable television networks, the Internet, ATM networks, frame relay networks, local area networks (LANs) or wide area networks (WANs).

The invention presented in FIGS. 1 through 3 addresses the problems in the art. The power of the stationary computer 10 allows comprehensive searching and indexing to be implemented, features which are not currently available in electronic or printed field guides.

Also, unlike dedicated electronic devices such as the identiflyer, the system of the invention allows the data files and software code to be easily updated either via new CD roms, or via a communication connection such as the Internet.

Other advantages over the prior art are clear from the description of the preferred embodiments which follow.

The preferred embodiment of the invention is presented by means of two sets of flow charts: FIGS. 3A and 3B which present the flow of the algorithm residing on the stationary computer 10, and FIGS. 4A and 4B which present the flow of the algorithm residing on the portable computing device 12. As well, exemplary screen displays are shown in FIGS. 6 through 11, which correspond to particular method steps as described.

It is preferred that all of the necessary software programming and at least the basic multimedia content be provided to the end user on one or more CD-roms. CD-roms are currently the best medium because of their low cost, high capacity and high reliability. However, new technologies may become adapted over time, which make an alternative medium more desirable.

The software code was written in VisualBasic mainly because of its efficient use of system resources. With VisualBasic, it is very easy to access operating system routines which are already provide the functionality for many of the displays, menus and I/O (input and output) that are required. The invention could clearly be implemented with more dedicated software code, but this would consume additional memory space on the Palm.

The invention could also be implemented using HTML and Java Applets, which would require a Java-enabled Web Browser on the Palm. This solution would require more memory on the Palm than the VisualBasic solution, but if Palms become available with an integral Web Browser, it may be an effective solution.

Figure 4A:
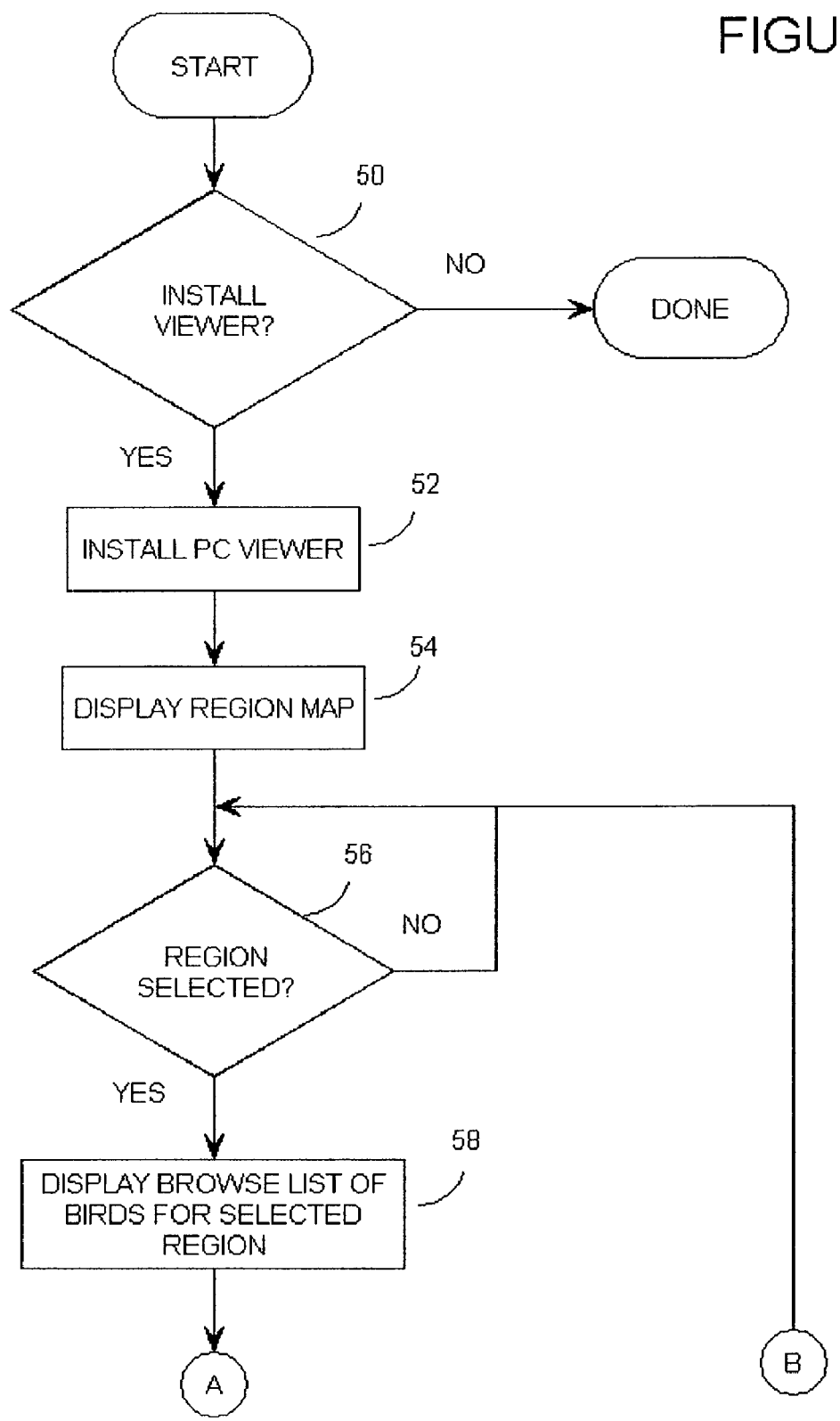
FIGS. 4A and 4B present a flow chart of the stationary computer component, of a method of provisioning electronic field guides, in a preferred embodiment of the invention.
Figure 4B:
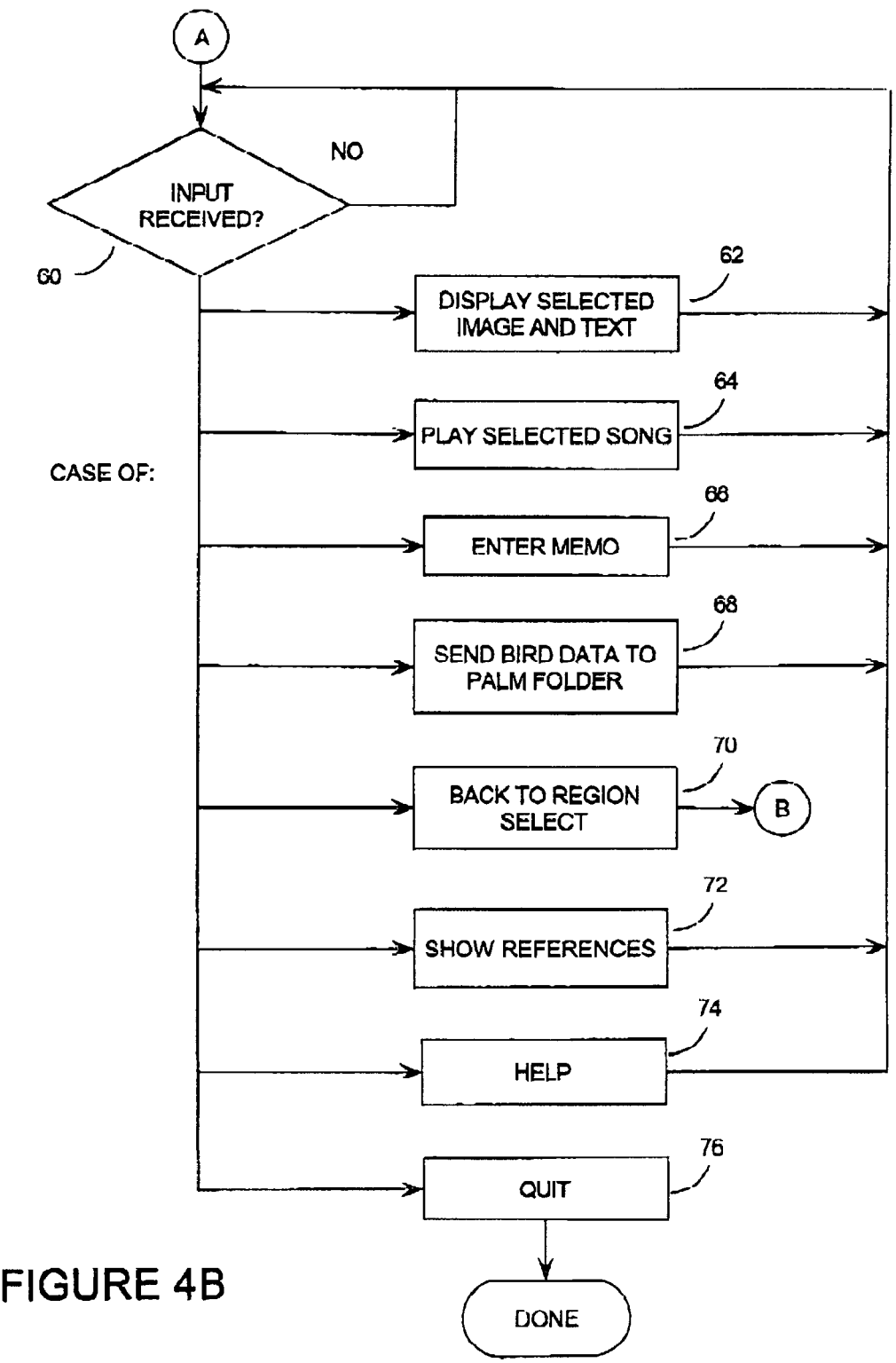

Thus, the algorithm begins at step 50 of FIG. 4A, when the end user loads the first CD-rom into his/her personal computer (PC) 10. The software automatically launches and inquires as to whether the end user wishes to install the PC viewer, which is required to continue operation of the software. If the end user declines, the algorithm ends. If the end user answers this query in the affirmative, the viewer is loaded onto the PC 10 at step 52. The end user may also install an icon on his/her Windows desktop, so that the PC viewer can easily be launched when desired.

Figure 6:
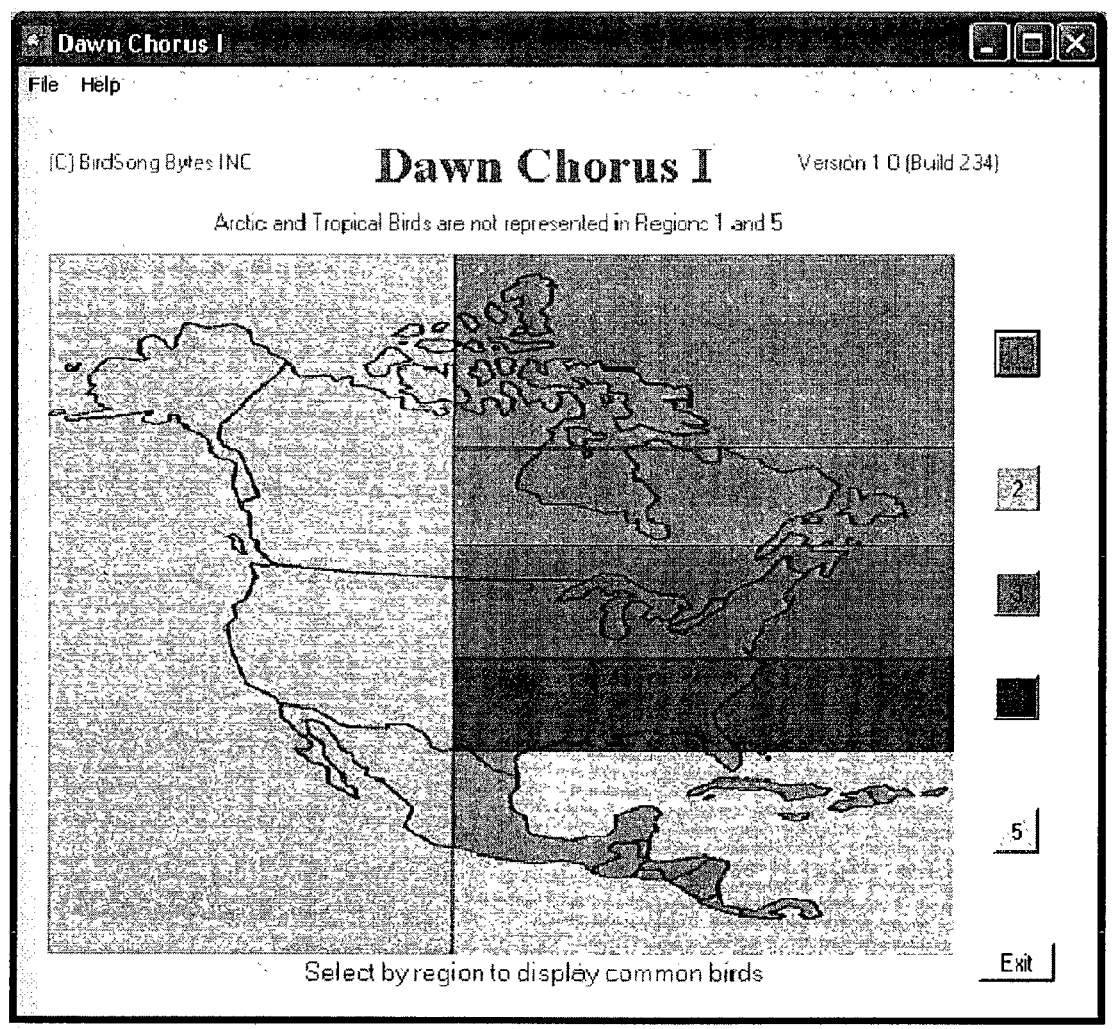
FIG. 6 presents an exemplary region screen display for the stationary computer, in a preferred embodiment of the invention.

After installing the PC viewer, it may be launched, displaying the opening screen at step 54, which is a colour-coded region map. An exemplary region map of North and Central America is shown in FIG. 6. In this embodiment, this area is shown to be divided into five regions each with a selection tab. Clearly, these divisions could be made in different ways, for example, rather than using straight lines, lines could be used that follow geographic features more closely. The layout of the lines will also depend on the nature of the content being presented by the system. Certain flora or minerals, for example, may be very specific to certain areas, so it may be of interest to define the areas accordingly. Birds, on the other hand, may venture far from their typical areas, so it is less important for these regional divisions to be precise.

Once a region is selected at step 56, a browse list of birds available in that selected region is presented at step 58. This browse list will be presented to the end user as area 110 shown in FIG. 7. In the preferred embodiment, the browse list presents the common name for each bird in the region, the scientific name, and reference codes corresponding to four common bird-watching guides. As shown in FIG. 8, the four reference guides in the preferred embodiment are from National Geographic, National Audubon, Robbins, and Peterson.

Figure 7:
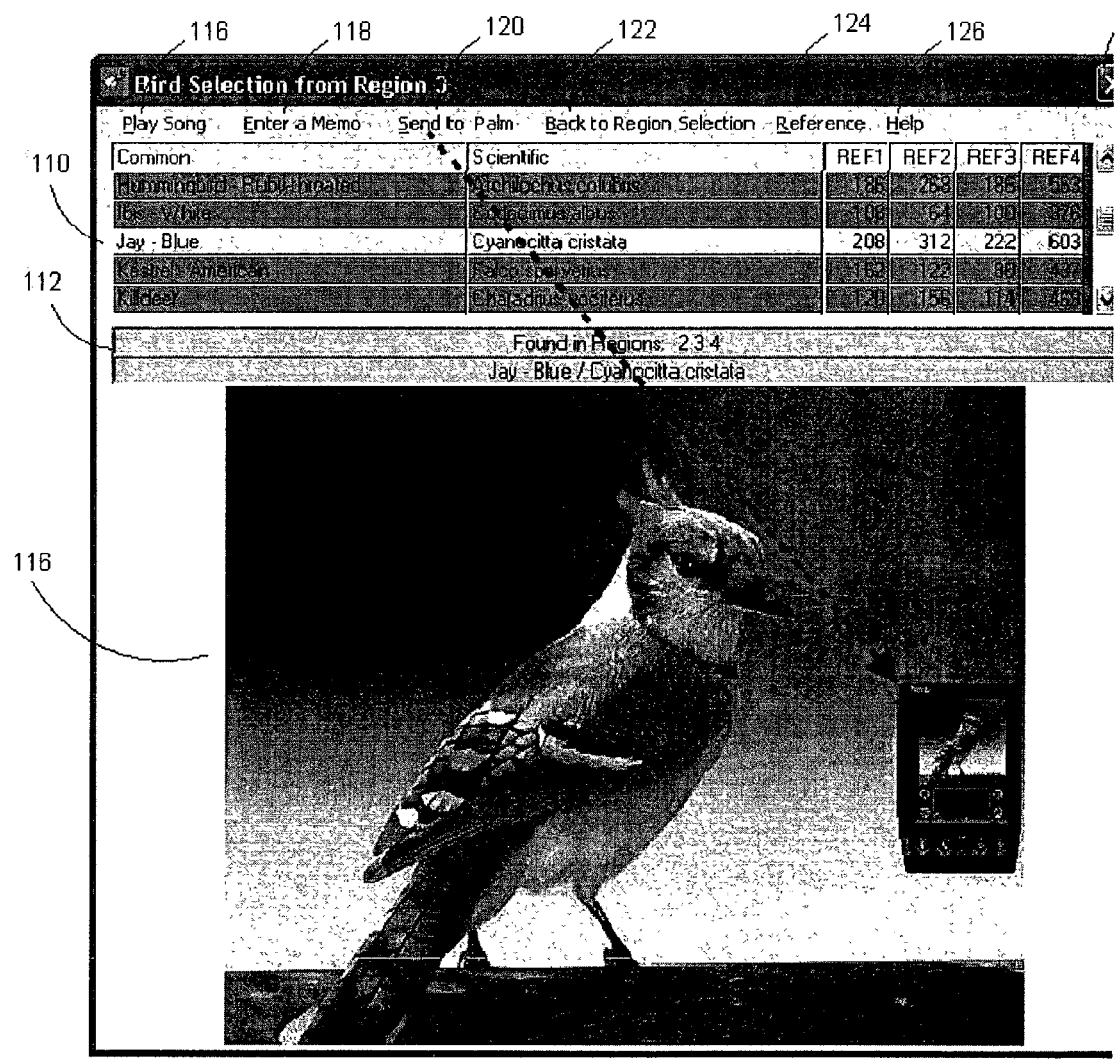
FIG. 7 presents a main browse list and image viewing display screen for the stationary computer, in a preferred embodiment of the invention.
Figure 8:
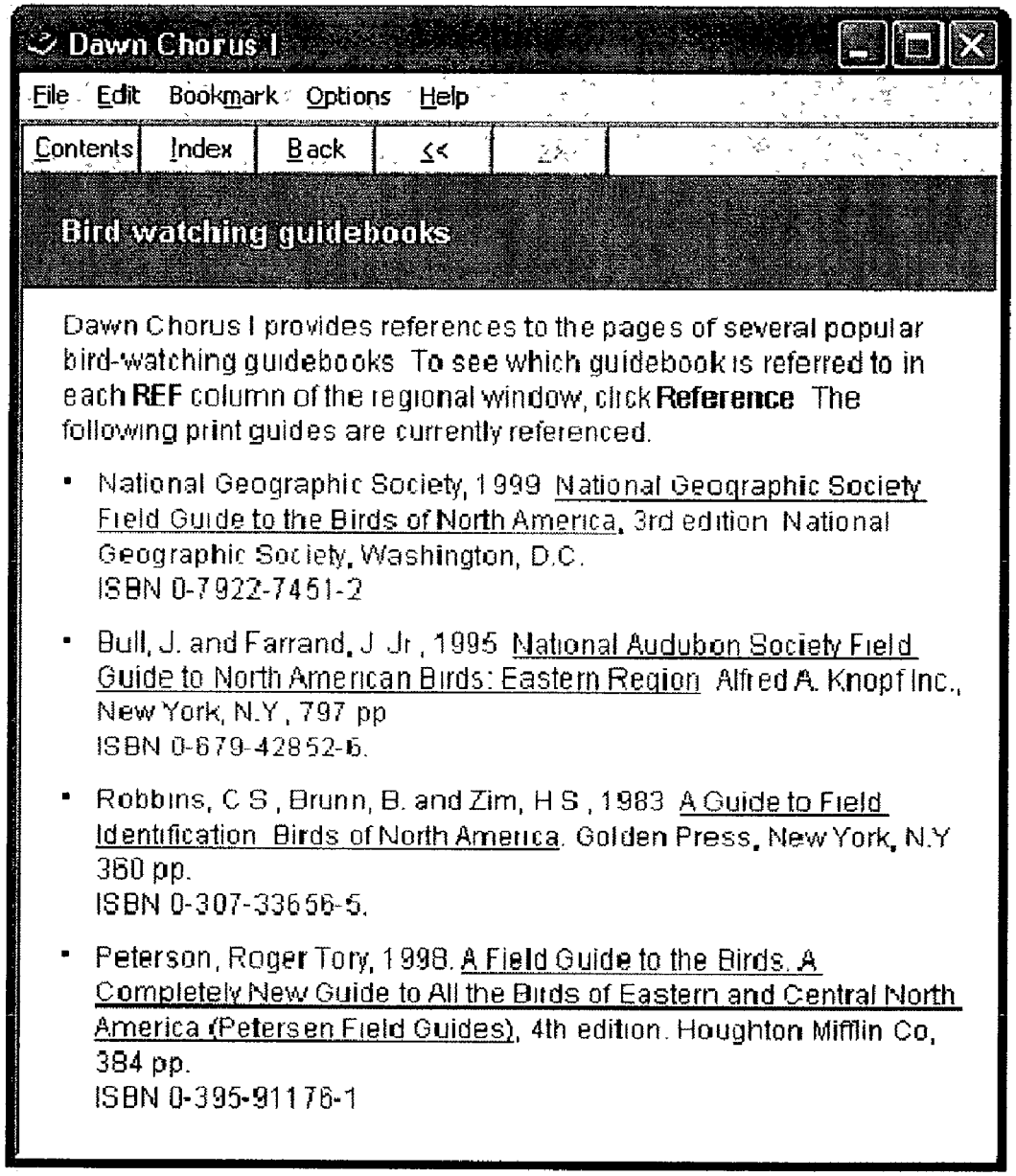
FIG. 8 presents an exemplary reference screen display for the stationary computer, in a preferred embodiment of the invention.
Figure 9:
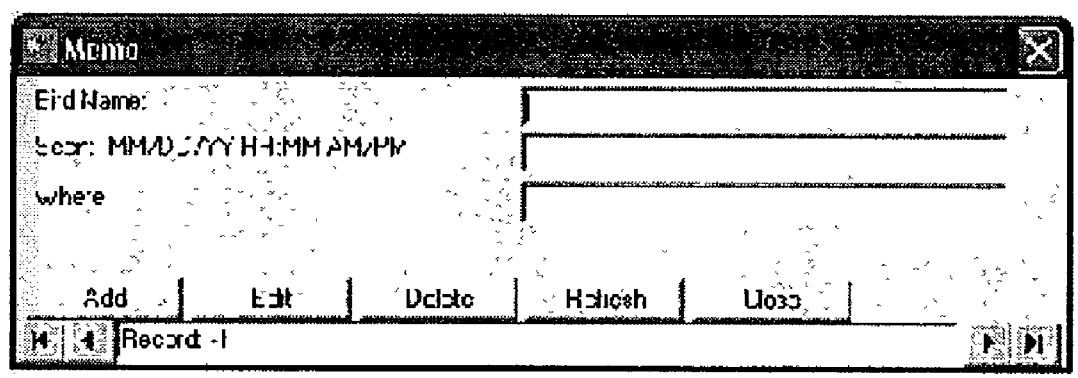
FIG. 9 presents an exemplary memo screen display in a preferred embodiment of the invention.

From the display screen of FIG. 7, the end user has a multitude of options available to him. These options are presented in FIG. 4A in the form of a "case of" statement at step 60, but in the preferred embodiment, a combination of pull-down menus, tabs, clicks, and double-clicks are used as inputs.

Specifically, clicking once on an identified bird's name causes three things to happen at step 62:

1. the selected row in the browse list will be distinguished from the other rows, for example, by using background shading, or inverse video;
2. a new text row will be displayed (area 112 of FIG. 7), identifying all of the regions in which the selected bird may be found; and
3. an image of the bird will be presented in area 114 of FIG. 7.

Control then returns to the input mode at step 60.

Double clicking on a selected bird name, or clicking on the "Play Song" tab (item 116 in FIG. 7) in the toolbar will cause a 15 second long sound clip of the selected bird to be played at step 64. This is done simply by accessing a stored audio file corresponding to the selected bird, and playing this audio file using an existing audio driver. Proprietary audio drivers could easily be developed and provided as part of the software package on the CD-rom. After the audio clip has been played, control returns to the input mode at step 60.

The end user may also enter personal memos regarding a particular bird at step 66 by clicking on the "Enter a Memo" tab on the tool bar (item 118 in FIG. 7). Doing so will launch the display screen shown in FIG. 9, which has entries for the bird name, when it was seen, and where. As well, menu functions are provided including add, edit, delete, refresh and close the memo entry. The functionality of these selections are self-explanatory and would be know to one skilled in the art. As well, these functions and the software coding necessary to implement them are standard to programming in current Windows operating system environments.

If the end user wishes to download the multimedia data for a particular bird to his/her hand-held computer 12, he/she simply clicks on the "Send to Palm" tab in the tool bar (item 120 in FIG. 7), and a multi-media data file will be sent to the Palm folder on his/her PC 10 at step 68. Then, when the hand-held computer 12 is mounted in its cradle 14, any software files in the Palm folder will automatically be downloaded to the Palm (this is referred to as synchronizing or "syncing" in the art).

The nature of this multi-media data file will depend on the operating system of the hand-held device, and the viewer being used on it. In the preferred embodiment of the invention, the picture files are stored on the CD-rom as jpg files and the sound files are stored as wav files. However, because a TealPoint™ viewer is being used on the Palm, the audio, text and images are stored in Palm database files called .pdb files which are playable only on the TealPoint™ viewer. Just as easily, various image formats could be used including gif, mpeg, tiff and jpg, and various audio formats could be used such as avi and wav.

The parameters of the audio and image data should be optimised to suit the target platform, giving the best reproduction without unnecessarily consuming additional memory on the Palm. There is no point, for example, in sending image files to the Palm with any more detail than the Palm can resolve to its display screen.

Figure 10:
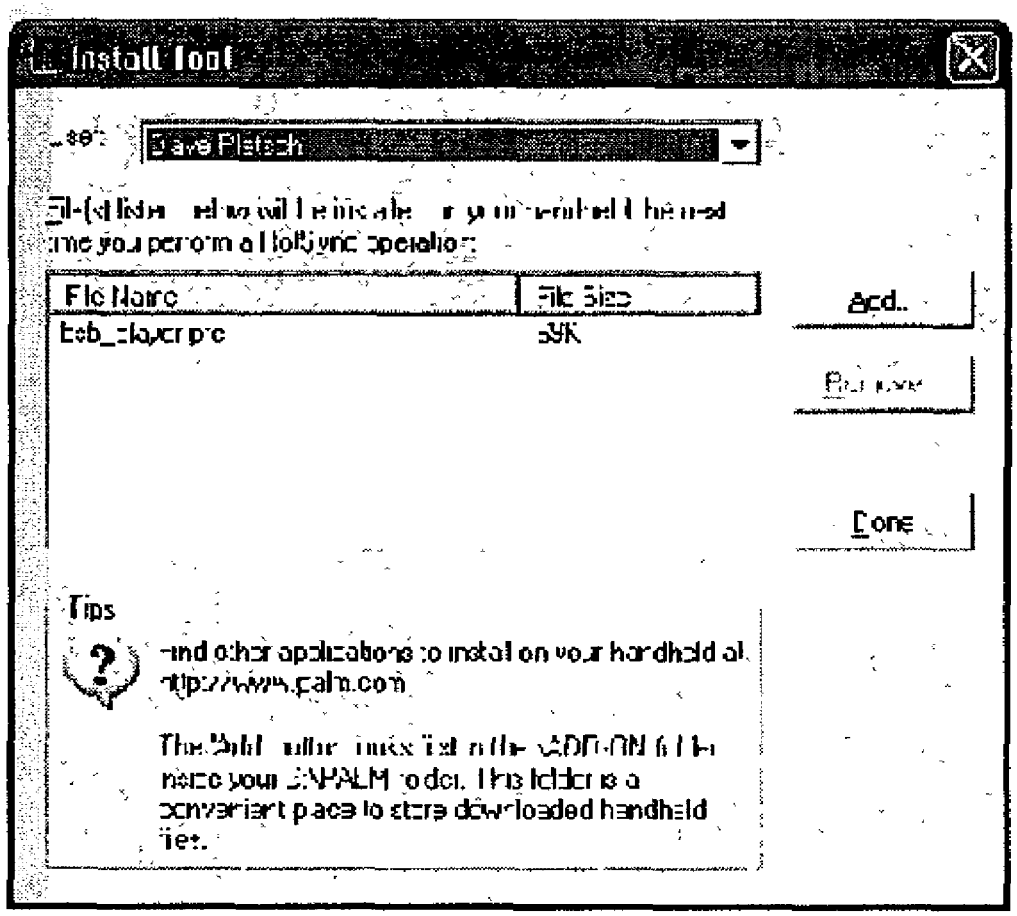
FIG. 10 presents a control panel for managing the files to be downloaded to the portable device, in a preferred embodiment of the invention.

When a bird has been selected to be sent to the Palm, the display screen of FIG. 10 is presented, which shows all of the birds presently selected to be downloaded. As part of this display, the end user is advised of the memory capacity required for each bird, as the most limiting factor on the Palm will be its storage capacity. Thus, the end user has the opportunity to add or remove birds from the list, and then return to the input screen at step 60.

If the end user selects the "Back to Region Selection" tab at step 70 (item 122 in FIG. 7), then the routine returns to step 56 in FIG. 4A, so that a new region can be selected.

As noted above, the bases for the reference number presented in the browse list can be accessed by selecting the "Reference" tab in the main toolbar (item 124 in FIG. 7) at step 72. This simply presents the display screen shown on FIG. 8, from which the end user can exit by striking the "Back" tab or the "<<" tab.

Striking the "Help" tab in the toolbar (item 126 in FIG. 7) at step 74, opens a display with text defining the operation of each toolbar item. Optionally, it could also offer a more comprehensive instructions regarding operation, including troubleshooting tips and the like.

Finally, selecting the "X" tab (item 120 in FIG. 7) at step 76 terminates the program, completing the algorithm.

The software on the Palm or other hand-held device offers complementary functionality. Referring to the flow charts of FIGS. 4A and 4B, the routine begins when the portable device 12 is mounted in its cradle 14 at step 80, and synchronization with the stationary computer 10 is initialized at step 82, downloading all of multimedia files for the birds selected by the end user. If this is the first time the end user has run the program, this synchronization will also download the Palm viewing software (stored as a .prc file; a standard Palm program file), and create a viewer icon on the Palm.

The end user then simply clicks on the viewer icon at step 84 to open the viewer at step 86. At step 88, the end user is then presented with a browse list of the names of birds whose multimedia data had been downloaded to the Palm. Although a region map could be presented at this stage, rather than a complete browse list, it would be quite demanding on the limited resources of the Palm. Thus, in the preferred embodiment of the invention, the region map was not used.

Figure 5A:
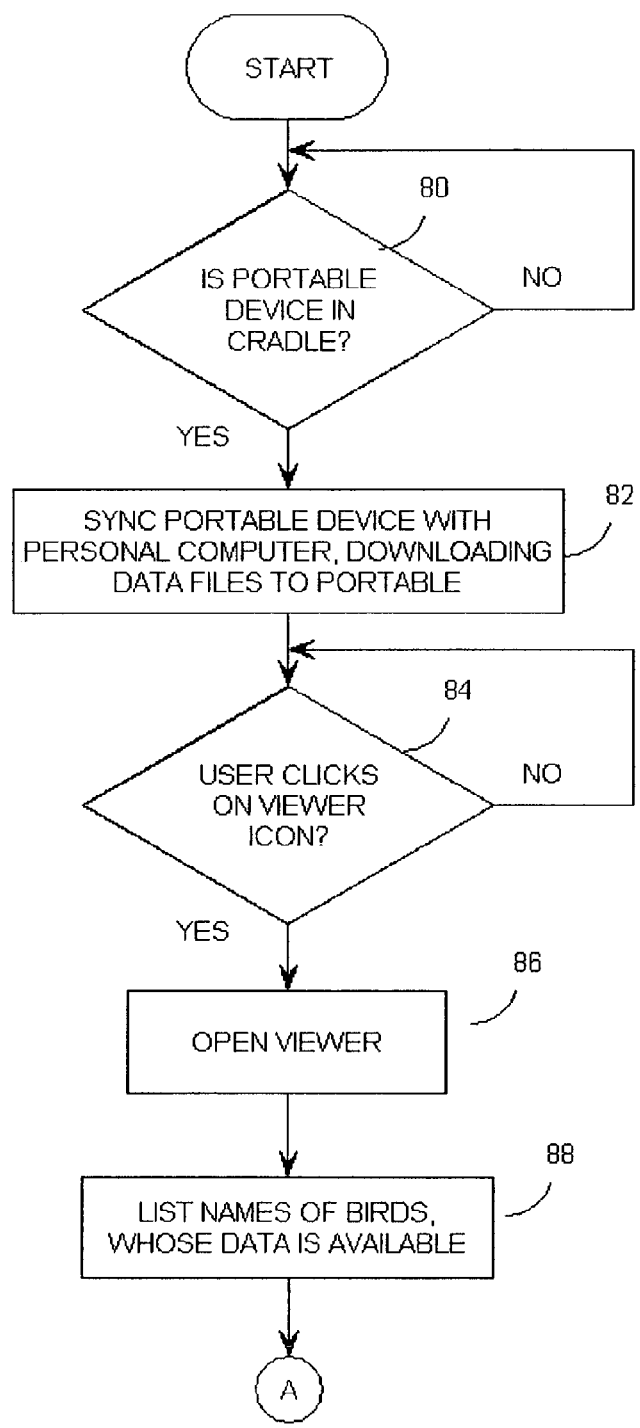
FIGS. 5A and 5B present a flow chart of the portable computer component, of a method of provisioning electronic field guides, in a preferred embodiment of the invention.
Figure 5B:
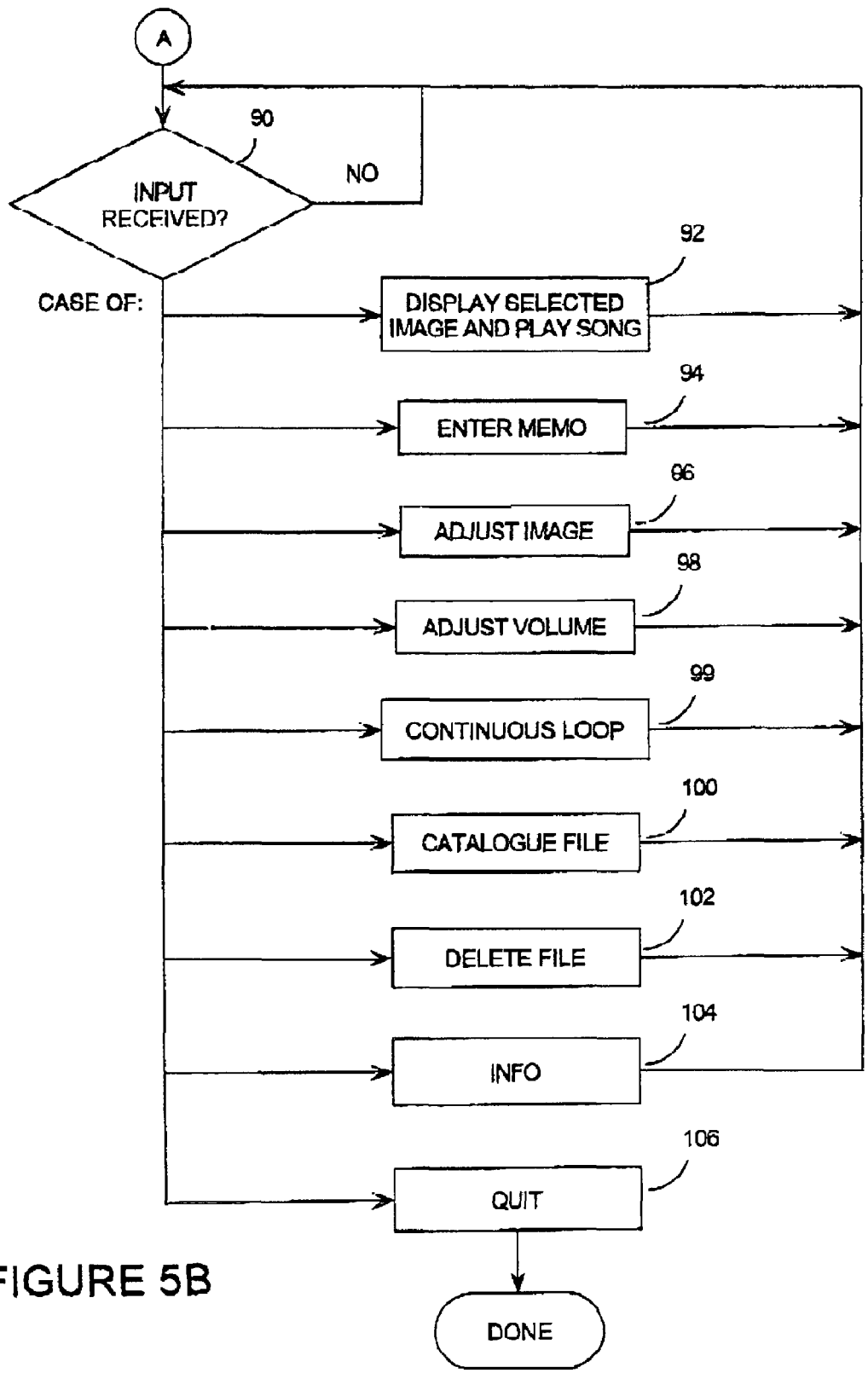

From this browse list, the end user has a number of options at step 90 of FIG. 5B, which are accessible using a combination of tabs, pull-down menus, clicks, and double-clicks. Specifically, tapping the "Play" tab on the Palm and then tapping on a selected bird name will cause the image of the selected bird to be displayed and the 15 second long sound clip of the bird to be played at step 92. In the preferred embodiment of the invention, a customized TealPoint™ viewer was used to present the images and play the sound, though there are many other Palm based viewers available. Because the image and sound are stored in the same file in the TealPoint™ system, they are both initiated using the same instruction. Different viewers may initiate the image and sound separately.

Although additional data, such as the regions, references and scientific name could be presented, presenting such data may consume valuable memory and display screen space.

The end user may also enter personal memos regarding a particular bird at step 94 by clicking on the appropriate tab in the tool bar. Doing so will launch the standard Palm memo input screen and the memo will be stored as a separate file, which can be synched back to the stationary computer 10 when the Palm 12 is returned to its cradle 14.

In the preferred embodiment of the invention, the standard Palm memo routine was used rather than preparing dedicated code due to the extra demands this would have on the system resources. This could easily be done however, and as portable devices increase in power, most certainly will be done.

The end user may also adjust certain parameters of the image player and the audio player. In the case of the TealPoint™ viewer being used in the preferred embodiment, the gamma of the image may be adjusted at step 96 (essentially the lightness and darkness of the image), and the volume of the audio may be adjusted at step 98. If a proprietary viewer is developed, there is no limit to the parameters which can be made adjustable by the end user.

There are also a number of other features which are common to standard palm software. For example:

tapping on the "Loop" tab, will cause the audio file to be played continuously at step 99;

tapping on the "Cat" or catalogue tab, will cause the file to be catalogued within the Palm file system at step 100;

tapping on the "Del" or delete tab, will cause the selected file to be removed at step 102; and tapping on "Info" or information tab, will display size and copyright information on the selected file at step 104.

Finally, the end user may terminate the Palm routine by tapping on the "Home" tab, causing a return to the home Palm display at step 106.

The invention is not limited to the particular embodiments described herein. Many alternative implementations building on the invention would be clear to one skilled in the art, including the following:

to include software and compatible hardware that allows voice/word recognition so that when the end user speaks into the hand-held unit, the systems recognizes the word, such as the name of the bird, and scrolls through the files, coming up with the information which includes song or call, photograph or other illustration, of the bird; and to allow public user pay outlets, kiosks or similar facilities where the end user can download the sort of information described above onto a personally owned or rented hand-held device. The public outlets could be a counter-top, booth-ready, or other coin operated or salesperson-operated device for delivery of the information. Content could also be provided over the Internet or a similar computer network, using an e-commerce system as known in the art.

Although particular embodiments of the present invention have been shown and described, it is clear that changes and modifications may be made to such embodiments without departing from the true scope and spirit of the invention.

The invention could easily be applied to other content which is typically presented in field guides, such as plants, animals, insects, sea life, and rocks and minerals. These products could be dedicated to certain geographical areas such as national parks, mountain ranges or river basins; to certain seasons; or to particular eco-tours.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or a similar device programmed in the manner of method steps, or may be executed by an electronic system which is provided with means for executing these steps. Similarly, an electronic memory medium such computer diskettes, CD-roms, Random Access Memory (RAM), Read Only Memory (ROM) or similar computer software storage media known in the art, may be programmed to execute such method steps. As well, electronic signals representing these method steps may also be transmitted via a communication network.

The specification and drawings are, accordingly, to be regarded in an illustrative rather than a restrictive sense. It should be understood that various alterations, modifications, improvements, or the like can be made based on the knowledge of a person having ordinary skill in the art without departing from the broader spirit and scope of the invention as set forth in the appended claims.

What is claimed is:

1. A system for provisioning electronic field guides comprising:

a portable computing device having:
a visual display;
an end user input interface; and
a memory;
a stationary computer having:
a visual display;
an end user input interface; and
a memory;
means for interconnecting said stationary computer and said portable computing device; said stationary computer being operable to:
present a map with defined geographic regions;
associate multiple data items with said defined geographic regions, wherein said multiple data items are selected from the group of plants, animals, insects, marine life, rocks, and minerals;
respond to the selection of one or more of said geographic regions by said end user,
by:
presenting said multiple data items available for said one or more geographic regions;
downloading multimedia data files corresponding to said multiple data items associated with said one or more geographic regions, to said portable computing device via said means for interconnecting; and said portable computing device being operable to:
  present a listing of said downloaded multiple data items; and
  respond to the selection of one of said downloaded multiple data items by displaying or playing said corresponding multimedia data file on said portable computing device.

2. A method for provisioning electronic field guides comprising the steps of:
  presenting a map with defined geographic regions to an end user;
  associating multiple data items with said defined geographic regions, wherein said multiple data items are selected from the group consisting of plants, animals, insects, marine life, rocks, and minerals; and
  responding to the selection of one or more of said multiple data items associated with one of said defined geographic regions by said user, by:
    downloading multimedia data files corresponding to said one or more of said multiple data items, to a portable computing device;
  whereby said portable computing device operable to play the multimedia data files on said portable computing device to the end user in the field.

3. The method of claim 2 in which said multimedia content includes images and text, whereby images are viewed on said portable computing device.

4. The method of claim 2 in which said multimedia content includes audio files, whereby sounds are reproduced on said portable computing device.

5. The method of claim 2 in which said stationary computer is a personal computer.

6. The method of claim 2 in which said stationary computer is an information kiosk providing said content in exchange for some form of payment.

7. The method of claim 2 in which said multimedia data files are stored on a CD-rom.

8. The method of claim 2 in which updates to said multimedia data files are accessed over an Internet network.

9. The method of claim 2 in which said multimedia data files are stored remotely from said stationary computer and are accessed over an Internet network.

* * * * *

UNITED STATES PATENT AND TRADEMARK OFFICE
CERTIFICATE OF CORRECTION

PATENT NO. : 7,162,362 B2 Page 1 of 1
APPLICATION NO. : 10/092162
DATED : January 9, 2007
INVENTOR(S) : Sherrene D. Kevan et al.

It is certified that error appears in the above-identified patent and that said Letters Patent is hereby corrected as shown below:

Col. 10, line 57, "from the group of plants…" should read -- from the group consisting of plants… --

Signed and Sealed this

Sixteenth Day of October, 2007

JON W. DUDAS
*Director of the United States Patent and Trademark Office*